United States Patent [19]

Minuto

[11] 4,242,137
[45] Dec. 30, 1980

[54] IMAGE TRANSFER COMPOSITION

[76] Inventor: Maurice A. Minuto, 15 Heminway Dr., Dix Hills, N.Y. 11746

[21] Appl. No.: 71,310

[22] Filed: Aug. 30, 1979

[51] Int. Cl.³ .......................... C08L 1/26; C09K 3/00
[52] U.S. Cl. .................................. 106/14.5; 106/189; 106/197 R; 106/197 C
[58] Field of Search .............. 106/189, 197 R, 197 C, 106/14.5

[56] References Cited

U.S. PATENT DOCUMENTS

| | | | |
|---|---|---|---|
| 2,163,934 | 6/1939 | Collins | 106/14.5 |
| 3,350,344 | 10/1967 | Beers | 260/22 XA |
| 3,661,790 | 5/1972 | Dean et al. | 260/37 SB |

*Primary Examiner*—Allan Lieberman
*Attorney, Agent, or Firm*—James W. Badie

[57] ABSTRACT

A novel composition of matter for use as image transfer medium in the form of a viscous or semi-viscous solution. The composition basically consists of water, a thixotropic agent (hydroxyethyl cellulose) and a water-soluble glycol (1,3-butylene glycol) and includes, optionally, a water-insoluble glycol (hexanediol) to enhance the color of printed color matter. Images imprinted on putty-like substances may be transferred to surfaces which have been coated with such compositions.

12 Claims, No Drawings

IMAGE TRANSFER COMPOSITION

BACKGROUND OF INVENTION

This invention relates to an image transfer composition and is particularly related to a composition of matter in the form of a viscous or semi-viscous fluid for such purpose.

Putty-like substances have been widely marketed by the toy industries for approximately 25 years. Due to their elasticity, non-toxicity and other desirable attributes, these silicone substances, which are commonly referred to as "silly-putty" or "bouncing putty" are used largely by children to bounce it, stretch it, form it into various shapes and press it against printed matter to transfer the print (e.g., cartons and other pictorial illustrations) onto the surface of the putty. Examples of such putty-like substances are described in U.S. Pat. No. 3,350,344 issued to Melvin D. Beers on Oct. 31, 1967 and U.S. Pat. No. 3,661,790 issued to Dean et al on May 9, 1972. In addition to their bouncing ability, some bouncing putties also exhibit the ability to glow in the dark after exposure to a light source.

While the presently marketed bouncing putty can be used to transfer images and prints onto its surface when pressed against the printed matter, these images cannot be transferred to another sheet or surface since the silicone putty does not release the ink from its surface.

It has now been found that such image transfer may be facilitated by first spreading and rubbing onto a transfer sheet or surface, a fluid media having the composition hereinafter described and then pressing the putty thereon with its imaged surface firmly pressed against the transfer sheet or surface.

It is accordingly an object of this invention to provide a fluid medium for transferring prints and images from one surface to another by using bouncing putties.

It is a further object of this invention to provide a novel composition of matter in the form of a viscous or semi-viscous fluid which, when rubbed onto a surface such as the human skin or onto a sheet of paper, permits images imprinted on silicone putty to be transferred on such sheets or surfaces.

It is also an object of this invention to provide such image transfer fluid medium which is non-toxic, non-irritating and free from adverse or harmful effects for use by children with silly putties for the aforementioned purposes.

SUMMARY OF INVENTION

Images imprinted on putty-like substances may be transferred onto another surface (e.g., a sheet of paper or the human skin) when such surfaces are coated with an image transfer medium having the composition described herein. The image transfer medium which is made as a viscous or a semi-viscous fluid basically consists of water, a thixotropic agent, preferably hydroxyethyl cellulose and a water soluble glycol, preferably 1,3-butylene glycol and, optionally, it may include a water-insoluble glycol such as hexanediol to enhance color reproduction when printed color matter is being reproduced on another surface.

The silicone putty like substance is first pressed against the printed matter to form an image on the surface of the putty. The image transfer medium is then applied by rubbing it onto a sheet of paper or the skin. When the putty is pressed onto this sheet or the skin, a clear image of the printed matter is transferred thereto and appears thereon.

DETAILED DESCRIPTION OF INVENTION

In accordance with this invention, it has been found that when a fluid medium having the composition hereinafter described is applied to a sheet of paper or to the surface of the human skin, prints and images imprinted on bouncing putties can be transferred onto such other surfaces.

The novel image transfer medium or composition of this invention basically consists of water, a thixotropic agent, and a water-soluble glycol. Optionally, and desirably, the composition includes hexanediol or other water-insoluble glycols in order to bring out the color whenever printed color matter is transferred from one surface to another. Thus, the composition of this invention is prepared by mixing together the following ingredients wherein all parts are by weight:

(1) from about 300 to about 400 parts of water, (2) from about 1 to about 10 parts of a thixotropic agent such as hydroxyethyl cellulose or carboxymethyl cellulose (CMC), although hydroxyethyl cellulose is preferred, and (3) from about 80 to about 120 a parts of a water soluble glycol such as, for example, ethylene glycol, propylene glycol or butylene glycol, with 1,3 butylene glycol constituting the preferred water soluble glycol.

In addition, and optionally, the composition may include from about 15 to about 25 parts of hexanediol or some other water insoluble glycol such as hexylene glycol or octylene glycol. As previously mentioned, the hexanediol serves to bring out the color depth when transferring color images.

The mixture may be mixed by hand or in a suitable mixer until a homogeneous semi-viscous or viscous fluid is prepared which, when applied to the skin or a sheet of paper does not run off the surface. Typically the fluid composition of this invention has the consistency of maple syrup and is simply applied to the skin by dipping a piece of cloth or an applicator swab therein and then spreading and rubbing it onto the skin surface since it is non-toxic and non-irritating and has no harmful effect upon the human body.

One formulation consisting of 360 parts of water, 5 parts of hydroxyethyl cellulose, 100 parts of 1,3-butylene glycol and 20 parts of hexanediol was made as aforesaid and a portion thereof applied to a sheet of paper while another portion was applied by rubbing it onto the forearm of a human body. A commercially available bouncing putty was pressed onto a printed matter for a few seconds thereby forming an image of the prints on the putty surface. When the putty was pressed against the sheet of paper and forearm, a clear image of the printed matter was imprinted on both surfaces.

In all cases in which the image transfer fluid media of this invention were applied to the human skin there was no evidence of toxicity or skin irritation. In addition, and in one test 10 rats, 5 male and 5 female, each received by gavage, 5.2 ml/kg. of the aforedescribed formulation and observed over a two-week period. The test procedure was in accordance with the procedure set forth in 16 C.F.R. section 1500.3 (c) (1) and (2). The material was determined to be non-toxic and no deaths were observed among the rats.

What is claimed is:

1. An image transfer composition suitable as image transfer medium for reproducing printed matter which has been imprinted on the surface of putty-like substances, said composition comprising from about 300 to about 400 parts by weight water; from about 1 to about 10 parts by weight of a thixotropic agent selected from the group consisting of hydroxyethyl cellulose and carboxymethyl cellulose; and from the about 80 to about 120 parts by weight of a water soluble glycol selected from the group consisting of ethylene glycol, propylene glycol and butylene glycol.

2. An image transfer composition as in claim 1 wherein said thixotropic agent is hydroxyethyl cellulose.

3. An image transfer composition as in claim 1 wherein said water-soluble glycol is 1,3-butylene glycol.

4. An image transfer composition as in claim 2 wherein said water-soluble glycol is 1,3-butylene glycol.

5. An image transfer composition as in claim 1 further including from about 15 to about 25 parts by weight water insoluble glycol selected from the group consisting of hexanediol hexylene glycol and octylene glycol.

6. An image transfer composition as in claim 2 further including from about 15 to about 25 parts by weight water insoluble glycol selected from the group consisting of hexanediol hexylene glycol and octylene glycol.

7. An image transfer composition as in claim 3 further including from about 15 to about 25 parts by weight water insoluble glycol selected from the group consisting of hexanediol hexylene glycol and octylene glycol.

8. An image transfer composition as in claim 4 further including from about 15 to about 25 parts by weight water insoluble glycol selected from the group consisting of hexanediol hexylene glycol and octylene glycol.

9. An image transfer composition as in claim 5 wherein said water-insoluble glycol is hexanediol.

10. An image transfer composition as in claim 6 wherein said water-insoluble glycol is hexanediol.

11. An image transfer composition as in claim 7 wherein said water-insoluble glycol is hexanediol.

12. An image transfer composition as in claim 8 wherein said water-insoluble glycol is hexanediol.

* * * * *